Patented May 26, 1942

2,284,467

UNITED STATES PATENT OFFICE 2,284,467

HYDROHALOGENATION OF UNSATURATED HYDROCARBONS

Seaver A. Ballard, Berkeley, Calif., assignor to Shell Development Company, San Francisco, Calif., a corporation of Delaware No Drawing. Application February 28, 1940, Serial No. 321,290

14 Claims. (Cl. 260—663)

The present invention relates to the production of alkyl halides, and more particularly to a process for the preparation of alkyl halides from unsaturated organic compounds and a hydrogen halide.

It is known that alkyl halides may be produced by various processes involving the use of the corresponding saturated alcohol or of the esters of such alcohols with sulfuric acid. For example, ethyl chloride may be obtained by a batch process in which dilute sulfuric acid, sodium chloride and ethyl alcohol are heated together. According to such process, the ethyl alcohol and sulfuric acid are slowly introduced into a mixture of sodium chloride and dilute sulfuric acid, and the ethyl chloride evolved is passed through a reflux condenser which prevents the alcohol from escaping unchanged from the reaction vessel. This type of process has the disadvantage that a considerable time, generally about forty to fifty hours, is required to treat a single batch and to obtain the desired alkyl halide.

According to another process, ethyl chloride is produced by slowly introducing a mixture of ethyl alcohol and concentrated sulfuric acid into a mixture consisting of dilute sulfuric acid and sodium chloride, and the evolved vapors comprising substantially ethyl chloride, ethyl alcohol, hydrogen chloride and water, are allowed to escape and are carried into a second reaction vessel without being refluxed on leaving the first vessel. The second vessel contains a catalyst which promotes further reaction between the hydrogen chloride and the ethyl alcohol so that the resultant product is largely a mixture of ethyl chloride and water. In still other methods alkyl halides have been produced by reacting the corresponding saturated alcohols at elevated temperatures with aqueous hydrohalic acids such as hydrochloric acid, in the presence of sulfuric acid.

In all of these cases the alkyl alcohol, such as ethyl alcohol, is one of the starting materials. Since this substance does not occur as a natural raw material, it must be first produced by any one of the known processes. Obviously, the necessity of employing such additional process or step increases the ultimate cost of manufacturing the desired alkyl halide.

It is also known that alkyl halides, such as chlorides, bromides, iodides and fluorides, may be prepared by reacting an unsaturated hydrocarbon, such as an olefin, with a hydrogen halide in the presence of metal halide catalysts. The most common of these catalysts are aluminum chloride and bismuth chloride. All of these processes usually require the use of comparatively high temperatures and/or pressures, thus increasing both their initial and operating costs. Furthermore, the effective life of at least some of these catalysts, such as that of aluminum chloride, is relatively very short, while catalysts of the type of bismuth trichloride are expensive.

It has recently been proposed to prepare alkyl halides by absorbing olefins in sulfuric acid and then hydrolyzing the resulting mixture at relatively elevated temperatures with aqueous solutions of the hydrogen halide. According to this process, the aqueous hydrogen halide solution is preferably formed in situ in the reaction zone by the interaction of sulfuric acid with a metallic halide, or by the introduction of a metallic halide and of water into the sulfuric acid mixture containing the absorbed olefins. Besides the fact that the relatively high temperatures essential for the operation of such a process increase the operating costs, the presence of aqueous acid solutions causes the corrosion of the apparatus. Also, alcohols are formed as by-products, thus decreasing the yield of the desired alkyl halides.

It is, therefore, the main object of the present invention to provide a process which obviates any and all of the above and other defects incident to the previously known processes for the preparation of alkyl halides. Another object is to provide a novel process for the economic production of alkyl halides by the direct reaction of unsaturated organic compounds, such as unsaturated aliphatic and/or alicyclic hydrocarbons, with a hydrogen halide, such as hydrogen bromide, hydrogen chloride, hydrogen iodide and/or hydrogen fluoride.

A still further object of the present invention is to provide a process whereby unsaturated aliphatic and/or alicyclic hydrocarbons may be directly reacted with a hydrogen halide to produce high yields of the corresponding alkyl halides without the concurrent formation of alcohols and the corrosion of the reaction vessels. Still other objects of the invention will be apparent from the following description of the same.

It has now been discovered that the above and other objects may be attained by reacting anhydrous hydrogen halide with unsaturated organic compounds, such as the unsaturated aliphatic and/or alicyclic hydrocarbons in the presence of concentrated sulfuric acid, this reaction being effected at ordinary temperatures and atmospheric or only slightly elevated pressures. The term "concentrated sulfuric acid" as employed herein refers to an acid substantially free from water. Generally, sulfuric acid concentrations of 95% or higher should be employed. When the unsaturated non-aromatic hydrocarbons subjected to hydrohalogenation in accordance with the present invention add the hydrogen halide with some difficulty, it is preferable to employ sulfuric acid in concentrations in the neighborhood of 100%, somewhat lower concentrations being permissible with unsaturated organic reactants which can be hydrohalogenated more readily. However, the water content should be kept at a minimum to prevent or at least decrease the afore-mentioned defects of the prior processes. Since the presence of water dilutes the sulfuric acid, the unsaturated compound to be hydrohalogenated, as well as the hydrogen halide, should be substantially completely free from water. However, if very high concentrations of sulfuric acid are employed, particularly when fuming sulfuric acid is used, it is possible to effect a substantial hydrohalogenation even with reactants which contain small percentages of water which, as will be understood by those skilled in the art, will decrease the acid concentration. As long as such decrease is not excessive, i. e. if the orginal concentration of the sulfuric acid and the quantity thereof are such that the small percentages of water thus entering into the reaction zone do not lower the sulfuric acid concentration below the outlined lower limit, the presence of some moisture in either or both reactants is not objectionable. However, since the sulfuric acid apparently acts merely as a catalyst and may therefore be re-used continuously or otherwise for the catalytic hydrohalogenation according to the present invention, it is preferable to employ anhydrous or at least substantially anhydrous reactants, since otherwise the introduction of water will gradually effect an excessive dilution of the acid catalyst, thus greatly shortening the effective life thereof.

Representative unsaturated compounds which may be subjected to hydrohalogenation according to the present invention include primary, secondary and/or tertiary olefins, such as ethylene, propylene, the normal butylenes, isobutylene, the amylenes, the hexylenes, the heptylenes, and the like. Also, alicyclic unsaturated hydrocarbons, such as cyclobutene, cyclopentene, cyclohexene, cycloheptenes, cyclo-octylenes, and the like, may be thus hydrohalogenated. The aliphatic and cyclo-aliphatic olefins of the above class may be linked to one or more cycloalkyl and/or aromatic radicals. Compounds, such as 1-phenyl propene-2, and 1-phenyl-butene-2, and the like, fall within this class. The unsaturated organic compounds suitable for the hydrohalogenation may contain more than one olefinic linkage. Representative compounds of this group include butadienes, heptadienes, cyclo-heptadiene, and the like, their homologues and analogues. The invention is also applicable to the hydrohalogenation of partially halogenated unsaturated organic compounds of the above-defined class, particularly those unsaturated compounds wherein the double bond is relatively removed from the carbon atom to which the halogen is linked.

As stated, the hydrohalogenation of unsaturated organic compounds of the above-defined class may be effected in accordance with the process of the present invention by reacting the unsaturated compound or compounds with anhydrous or substantially anhydrous hydrogen halide in the presence of concentrated sulfuric acid, this reaction being carried out at ordinary or room temperatures and at atmospheric or only slightly elevated pressures. According to one specific embodiment of the invention, the unsaturated organic compound to be hydrohalogenated is first absorbed in the concentrated sulfuric acid, thus effecting the formation of the sulphate esters of said organic compounds. The anhydrous hydrogen halide gas may then be introduced in the gaseous state, for example, by bubbling it through the ester-containing acid mixture. Both steps of the process are preferably effected at substantially room temperature. The alkyl or cyclo-alkyl halides thus formed may then be removed from the reaction mixture by any one of the known methods, such as by extraction with an inert saturated hydrocarbon, by fractionation, etc. If the halides formed have relatively low boiling points so as to render them volatile under the operating conditions, they will be found in the effluent gas or vapor stream, and may be separately recovered for example by fractional condensation or the like.

Instead of first absorbing the unsaturated hydrocarbons in the sulfuric acid, it is also possible to effect the hydrohalogenation of these compounds by introducing the unsaturated hydrocarbons and the anhydrous hydrogen halide simultaneously into the concentrated sulfuric acid. Since the process may be effected in a batch, intermittent or continuous manner, the manner of introduction of the reactants into the catalyst may be varied depending on the type of operations employed. For example, the reactants may be introduced simultaneously into a vessel containing concentrated sulfuric acid. After this introduction has been continued for some time, the reaction mixture may be treated, for instance, by means of a solvent, such as inert saturated hydrocarbon, capable of separately recovering the organic halides formed. The sulfuric acid thus freed from the halides may then be re-used for the further catalytic hydrohalogenation in accordance with the process of the present invention. The process may also be executed in a continuous manner by continuously withdrawing from the reaction zone at least a portion of the organic halide-containing acid catalyst. The separation of the halides may be effected continuously or otherwise, whereupon the concentrated sulfuric acid thus, in effect, rejuvenated, may be continuously or otherwise returned to the reaction zone for further hydrohalogenation.

The hydrohalogenation reaction may be effected in the absence or continuous persence of a solvent capable of selectively dissolving the organic halide formed. The presence of such a solvent, however, is frequently advantageous, particularly when the reaction is to be effected in a continuous manner, due to the fact that the obtained organic halides may then be removed from the reaction zone, either continuously or intermittently, together with the solvent without the necessity of withdrawing the concentrated sulfuric acid employed as the reaction promoting agent. When a solvent is used for the separation of the alkyl and/or cyclo-alkyl halides from the reaction mixture, this solvent, besides possessing the property of selectively dissolving the halides, should be easily separable by distillation from such halides, and should be inert and stable in the presence of the concentrated sulfuric acid. Representative examples of such suitable solvents are the straight chain paraffinic hydrocarbons, such as propane, n-butane, n-pentane, and the like, their homologues and analogues, as well as the saturated cyclic hydrocarbons, as cyclopentane, cyclohexane, methyl cyclopentane, and the like. Obviously, other solvents having the above characteristics may also be employed.

It was pointed out above that the present hydrohalogenation process may be effected either by the simultaneous introduction of the hydrogen halide and the unsaturated compound into the reaction zone containing the concentrated sulfuric acid, or by first introducing the unsaturated compound into such acid, thereby forming the sulphate esters, followed by the addition of the hydrogen halide. It has been found, however, that, when the last mentioned modification is employed, it is desirable, if not essential, to have free acid present. In fact it was further discovered that the yield of the halides increased with a decrease in the concentration of the sulphate esters in the acid. Therefore, when the hydrohalogenation is to be effected by the two-step process of first forming the alkyl esters and then reacting them with the hydrogen halide, it is advisable to maintain a relatively low mol ratio of the unsaturated compound to the sulfuric acid in the acid liquor. For instance, as this will be shown more fully hereinbelow, an increase of the propylene to sulfuric acid mol ratio (in the acid liquor) from about 0.4 to 0.95 decreased the conversion of the propylene in such acid liquor to isopropyl chloride from about 92% to 56%.

The reaction is preferably effected at substantially room temperature. In fact, somewhat lower temperatures may be efficiently employed as long as they are above the freezing point of the sulfuric acid. The use of elevated temperatures is undesirable and should be avoided primarily because of the excessive side reactions such as polymerization, $SO_2$ formation, etc. The pressures employed may vary within relatively wide limits. For instance, although the reaction may be effected at atmospheric pressure, frequently higher pressures may be employed. For example, excellent yields were obtained when the hydrogen chloride pressure was maintained at about 60 pounds per square inch gauge.

Although fuming sulfuric acid may be effectively employed, its use results in the formation of some side reactions, particularly when the unsaturated organic compound reacts relatively readily with the hydrogen halide. Generally, the concentration of the sulfuric acid should be maintained in the range of about 97% to about 100%. However, in some cases this concentration may be dropped to about 95%, or even somewhat lower, without detrimentally affecting the hydrohalogenation reaction.

While the invention is susceptible to considerable variation and modification in the manner of its practical application, particularly as regards the nature and proportions of the reactions and catalyst, and the exact manner of procedure, the following examples will serve to illustrate how the invention may be practised.

Example I

Anhydrous propylene was gradually introduced into sulfuric acid having an acid concentration of 100% until the propylene concentration in the resulting liquid was in the neighborhood of 24%. Three hundred grams of this acid solution containing the sulphate esters were then cooled to 15° C. and commingled with approximately 225 c. c. of kerosene. Hydrogen chloride gas was then slowly introduced into this liquid mixture until absorption of the hydrogen chloride ceased, this point being detectable by a rise in pressure. The isopropyl chloride formed during the treatment of the ester-containing acid-kerosene mixture with the hydrogen chloride was found to have been extracted by the kerosene. A distillation of the kerosene layer yielded about 110 grams of isopropyl chloride.

Example II

A stream of equimolecular quantities of amylene-2 and anhydrous hydrogen chloride were slowly added to 97% sulphuric acid which was maintained in a state of agitation during the course of this reaction. The addition was continued until about 100 c. c. of the amylene were thus treated. The reaction mixture was then extracted with a solvent (Edeleanu treated kerosene). The distilled extract phase yielded 30 c. c. of amyl chloride.

Example III

A series of four runs were made to hydrochlorinate propylene in accordance with the process of the present invention. In all of the runs, propylene was first introduced into and absorbed in 98% sulfuric acid, the mol ratio of propylene to acid being different in each run. Thereafter, anhydrous hydrogen chloride gas was introduced gradually until a constant pressure, indicating the termination of the reaction, was obtained. The reactions were effected in the absence of any solvent, at a pressure of 60 lbs. per square inch gauge, and at a temperature of about 10° to 12° C. The effect of the propylene concentration in the acid liquor on the yield of isopropyl chloride may be seen from the following results:

| Mol ratio, propylene to sulfuric acid | Conversion of propylene to isopropyl chloride |
|---|---|
| | Percent |
| 0.94 | 56 |
| 0.66 | 60 |
| 0.54 | 86 |
| 0.41 | 92 |

It is clear that, other conditions being equal, the conversion rate increases with a decrease in the propylene concentration in the original acid liquor.

Example IV

About 400 grams (3.27 mols) of sulfuric acid having an 80% $H_2SO_4$ concentration were introduced into a flask equipped with an efficient stirrer, and about 2.27 mols of cyclopentene were slowly and gradually introduced thereinto over a period of one hour during which the sulfuric acid was constantly agitated and maintained at a temperature of about 0° to 5° C. After complete absorption of the cyclo-olefin, anhydrous hydrogen chloride was bubbled through the stirred mixture which was still maintained at the afore-mentioned temperature of 0° to 5° C. The bubbling of hydrogen chloride was continued for about 1½ hours during which approximately four mols of the gas were thus introduced. The mixture thus obtained was chilled to about −30° C. and extracted twice with iso-pentane employed in a quanttiy of about 500 c. c. for each extraction. An analysis of both the extract and raffinate phases showed that about 0.48 mol of the cyclopentene were converted to cyclopentyl chloride. A considerable quantity of cyclopentyl alcohol, as well as some cyclopentyl sulphates, were also obtained. The reason for the relatively low yield of the cyclopentyl chloride is believed to be due to the use of the relatively weak acid, stronger concentration under the employed operating conditions being undesirable because of the formation of polymers. This may, however, be avoided, and high yields of the desired cyclic monochlorides may be attained by employing stronger sulfuric acid while maintaining the reaction mixture under a relative high hydrogen chloride pressure.

Although the above examples were directed to the hydrochlorination of the unsaturated organic compounds of the class described hereinabove, it is obvious that all of these organic compounds may be subjected to hydrohalogenation with other hydrogen halides, such as hydrogen bromide or hydrogen iodide, in like manner and with substantially similar results. As noted, it is preferable to employ anhydrous or substantially anhydrous reactants to inhibit or prevent the dilution of the sulfuric acid which does not catalyze the hydrohalogenation reactions when its concentration is too low.

Since alkyl halides are usually insoluble or substantially insoluble in sulfuric acid, these halides may be frequently removed, for example, by allowing the mixture to stratify, thus forming a sulfuric acid layer and a layer containing the alkyl halides. These may then be separated by ordinary decantation.

I claim as my invention:

1. A continuous process for the production of alkyl chlorides which comprises continuously contacting an olefin and substantially anhydrous hydrogen chloride with sulfuric acid of a concentration of between about 97% and 100%, maintaining an olefin-acid mol ratio below about 0.5, maintaining the reactants at substantially atmospheric pressure and at a temperature between about room temperature and the freezing temperature of the sulfuric acid under operating conditions, and separately recovering the alkyl chlorides thus produced.

2. A process for producing alkyl chlorides which comprises reacting an unsaturated aliphatic hydrocarbon with substantially anhydrous hydrogen chloride in the presence of sulfuric acid containing between about 97% and about 100% $H_2SO_4$, maintaining in the reaction zone a low mol ratio of the unsaturated hydrocarbon to the sulfuric acid, and maintaining the reactants at a pressure not substantially in excess of about 5 atmospheres and at a temperature of between about room temperature and the freezing temperature of the sulfuric acid under operating conditions.

3. In a process for the production of non-aromatic chlorides, the steps of contacting an unsaturated organic compound selected from the class consisting of the unsaturated aliphatic and cyclo-aliphatic hydrocarbons and of the unsaturated partially halogenated derivatives thereof with substantially anhydrous hydrogen chloride at a pressure not substantially in excess of about 5 atmospheres and at a temperature of between about room temperature and the freezing temperature of sulfuric acid under operating conditions, in the presence of sulfuric acid of an $H_2SO_4$ concentration of between about 97% and 100%, and maintaining a low mol ratio of the unsaturated organic compound to the sulfuric acid in the reaction mixture.

4. A process for producing alkyl halides, which comprises reacting an unsaturated aliphatic hydrocarbon with a substantially anhydrous hydrogen halide in the presence of sulfuric acid of between about 97% and 100% $H_2SO_4$ concentration, and in the presence of a solvent having a preferential solubility for the alkyl halides, which solvent is substantially inert to the action of strong sulfuric acid, maintaining in the reaction zone a low mol ratio of the unsaturated hydrocarbon to sulfuric acid, maintaining the reactants at a pressure not substantially in excess of about 5 atmospheres and at a temperature between about room temperature and the freezing temperature of the sulfuric acid under operating conditions, and separately recovering the alkyl halides thus formed.

5. The process according to claim 4, wherein the reaction is effected substantially at atmospheric temperature, and wherein the mol ratio of unsaturated hydrocarbons to sulfuric acid is less than about 0.5.

6. A process for producing alkyl halides, which comprises reacting an unsaturated aliphatic hydrocarbon with a substantially anhydrous hydrogen halide in the presence of sulfuric acid containing about 97% to 100% $H_2SO_4$, maintaining a low mol ratio of the unsaturated hydrocarbon to sulfuric acid in the reaction zone, maintaining the reactants at a pressure not substantially in excess of about 5 atmospheres and at a temperature between about room temperature and the freezing temperature of the sulfuric acid under operating conditions, and separately recovering the alkyl halides thus formed.

7. In a process for the production of non-aromatic halides, the steps of contacting an unsaturated organic compound selected from the class consisting of the unsaturated aliphatic and cyclo-aliphatic hydrocarbons and of the unsaturated partially halogenated derivatives thereof with a substantially anhydrous hydrogen halide in the presence of sulfuric acid of an $H_2SO_4$ concentration of between about 97% and 100%, maintaining a low organic compound to acid mol ratio, maintaining the reactants at a pressure not substantially in excess of about 5 atmospheres, and at a temperature between about room temperature and the freezing temperature of the sulfuric acid under operating conditions, and separately recovering the halides thus produced.

8. The process according to claim 7, wherein the reaction is effected in the presence of a solvent which is adapted to selectively dissolve the produced organic halides and which is substantially inert to the action of the strong sulfuric acid.

9. In a process for the production of non-aromatic halides, the step of reacting an unsaturated organic compound selected from the class consisting of the unsaturated aliphatic and cyclo-aliphatic hydrocarbons and of the unsaturated partially halogented derivatives thereof with a substantially anhydrous hydrogen halide, in the presence of strong sulfuric acid, at a pressure not substantially in excess of about 5 atmospheres and at a temperature between about room temperature and the freezing temperature of the sulfuric acid under operating conditions.

10. The process according to claim 9, wherein the acid is of an $H_2SO_4$ concentration of between about 97% and 100%, and wherein said acid is employed in a quantity sufficient to catalyze the hydrohalogenation reaction.

11. In a continuous process for producing organic halides, the steps of continuously contacting an unsaturated organic compound selected from the class consisting of the unsaturated aliphatic and cyclo-aliphatic hydrocarbons and of the unsaturated partially halogented derivatives thereof and a substantially anhydrous hydrogen halide with sulfuric acid of a concentration of between about 97% and 100% $H_2SO_4$, maintaining in the reaction zone a low mol ratio of the unsaturated organic compound to sulfuric acid, maintaining the reactants at a pressure not substantially in excess of about 5 atmospheres and at a temperature between about room temperature and the freezing temperature of the sulfuric acid under operating conditions, and separately recovering the organic halide thus produced.

12. The process according to claim 11, wherein the hydrohalogenation reaction is realized in the presence of a solvent adapted to selectively dissolve the organic halides, said solvent being substantially inert to the action of strong sulfuric acid.

13. In a process for producing organic halides, the step of reacting an unsaturated organic compound selected from the class consisting of the unsaturated aliphatic and cyclo-aliphatic hydrocarbons and of the unsaturated partially halogenated derivatives thereof with a substantially anhydrous hydrogen halide at a pressure not substantially in excess of about 5 atmospheres and at a temperature between about room temperature and the freezing temperature of the sulfuric acid under operating conditions in the presence of sulfuric acid of a concentration of between about 97% and 100% $H_2SO_4$, said acid being employed in a quantity in excess of that necessary to absorb the unsaturated organic compound.

14. A process for effecting the hydrohalogenation of an unsaturated organic compound of the group consisting of the unsaturated aliphatic and cyclo-aliphatic hydrocarbons and the unsaturated partially halogenated derivatives thereof which comprises reacting the unsaturated organic compound with a substantially anhydrous hydrogen halide in the presence of sulfuric acid having a concentration greater than 95% at a temperature between about room temperature and the freezing temperature of the sulfuric acid under operating conditions.

SEAVER A. BALLARD.